United States Patent
Govyadinov et al.

(10) Patent No.: US 10,946,649 B2
(45) Date of Patent: Mar. 16, 2021

(54) PRINTING WITH AN EMULSION

(71) Applicant: Hewlett-Packard Development Company, L.P., Houston, TX (US)

(72) Inventors: Alexander Govyadinov, Corvallis, OR (US); Craig Olbrich, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/067,304

(22) PCT Filed: Apr. 29, 2016

(86) PCT No.: PCT/US2016/030221
§ 371 (c)(1),
(2) Date: Jun. 29, 2018

(87) PCT Pub. No.: WO2017/189003
PCT Pub. Date: Nov. 2, 2017

(65) Prior Publication Data
US 2019/0016133 A1 Jan. 17, 2019

(51) Int. Cl.
| B41J 2/14 | (2006.01) |
| C09D 11/023 | (2014.01) |
| C09D 11/36 | (2014.01) |
| B41J 2/01 | (2006.01) |
| C09D 11/30 | (2014.01) |
| C09D 11/38 | (2014.01) |
| B41J 2/21 | (2006.01) |

(52) U.S. Cl.
CPC ............. *B41J 2/1404* (2013.01); *B41J 2/01* (2013.01); *B41J 2/211* (2013.01); *C09D 11/023* (2013.01); *C09D 11/30* (2013.01); *C09D 11/36* (2013.01); *C09D 11/38* (2013.01); *B41J 2202/03* (2013.01)

(58) Field of Classification Search
CPC ... B41J 2/01; B41J 2/1404; B41J 2/211; B41J 2202/03; B41J 2202/06; C09D 11/023; C09D 11/30; C09D 11/36; C09D 11/38
See application file for complete search history.

(56) References Cited

U.S. PATENT DOCUMENTS

| 6,520,086 B1 * | 2/2003 | Newington ........... B41C 1/1066 101/457 |
| 7,182,436 B2 | 2/2007 | Silverbrook et al. |
| 8,894,761 B2 | 11/2014 | Birecki et al. |
| 9,194,861 B2 | 11/2015 | Hindson et al. |
| 2001/0003291 A1 | 6/2001 | Uematsu et al. |
| 2008/0174619 A1 | 7/2008 | Katsumura |

(Continued)

FOREIGN PATENT DOCUMENTS

JP 2015128870 7/2015

OTHER PUBLICATIONS

Carnie S. et al., Droplet Formation Inside a Venturi Liquid Mixer, May 21, 2010—University of Melbourne (Kodak)~15 pages.

*Primary Examiner* — Anh T Vo
(74) *Attorney, Agent, or Firm* — Nathan Rieth; Dierker & Kavanaugh PC

(57) ABSTRACT

In an example implementation, a method of printing with an emulsion, includes generating an emulsion of non-water based fluid and water based fluid on a printhead, and ejecting the emulsion through a printhead nozzle.

10 Claims, 4 Drawing Sheets

(56) References Cited

U.S. PATENT DOCUMENTS

| | | | |
|---|---|---|---|
| 2009/0241334 A1* | 10/2009 | Inoue | H05K 3/106 |
| | | | 29/846 |
| 2011/0148977 A1* | 6/2011 | Akiyama | C09D 11/324 |
| | | | 347/20 |
| 2011/0148978 A1* | 6/2011 | Akiyama | C09D 11/322 |
| | | | 347/20 |
| 2012/0105520 A1 | 5/2012 | Shimoda et al. | |
| 2013/0099018 A1* | 4/2013 | Miller | B05B 1/08 |
| | | | 239/10 |
| 2013/0235114 A1 | 9/2013 | Van Thillo et al. | |
| 2014/0292947 A1 | 10/2014 | Norikane et al. | |
| 2015/0132396 A1* | 5/2015 | Coulter | A61K 9/1658 |
| | | | 424/494 |

* cited by examiner

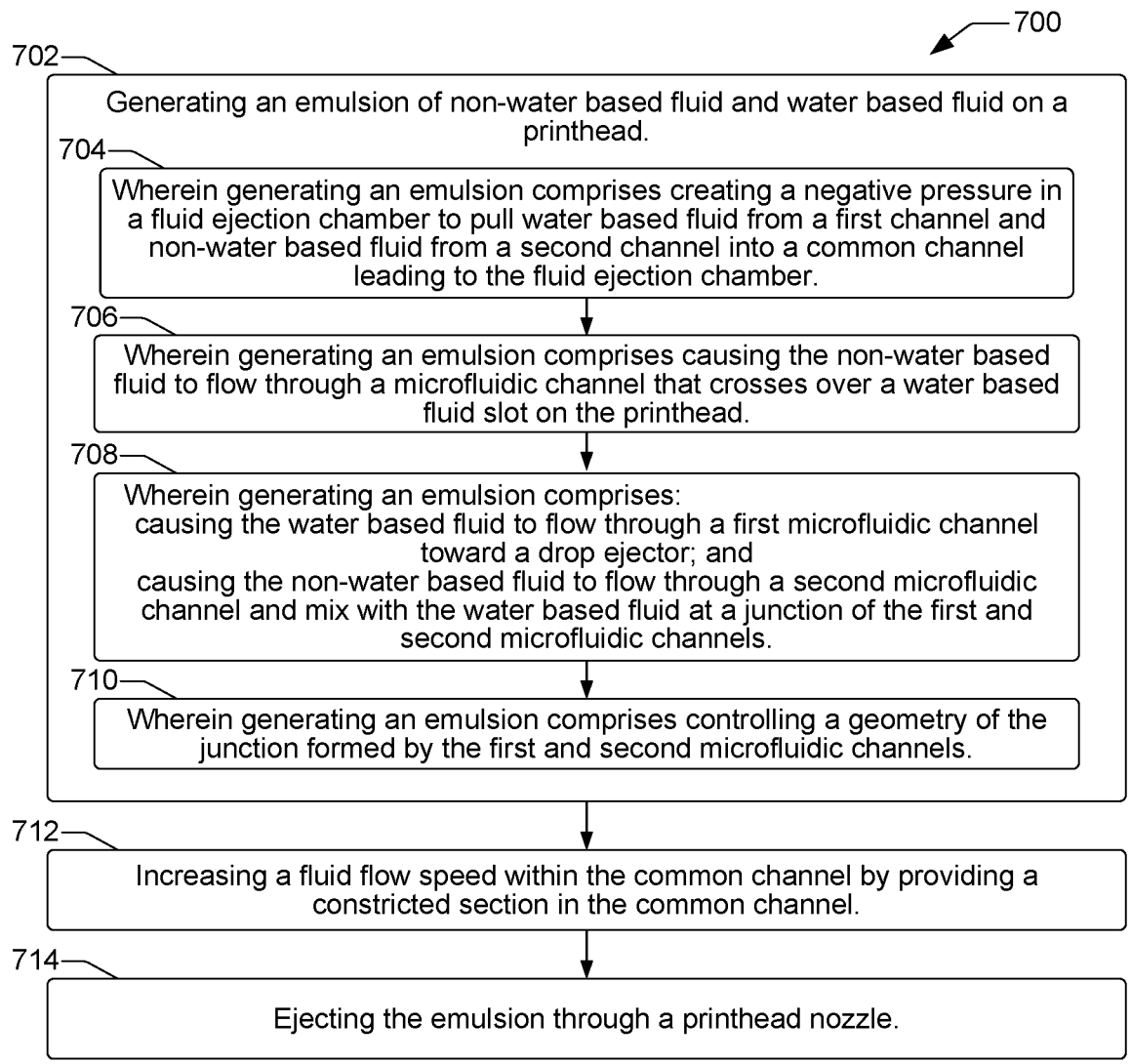

PRINTING WITH AN EMULSION

BACKGROUND

Inkjet printers enable high quality printing onto many types of media using a variety of different inks. Inkjet printers can use different mechanisms to eject ink and/or other fluid droplets from nozzles onto media. For example, thermal bubble inkjet printers use printheads with heating elements inside fluid-filled chambers to create vapor bubbles that force fluid droplets out of the printhead nozzles. Piezoelectric inkjet printers use printheads with piezoelectric ceramic elements inside fluid-filled chambers to generate pressure pulses that force fluid droplets out of the printhead nozzles.

BRIEF DESCRIPTION OF THE DRAWINGS

Examples will now be described with reference to the accompanying drawings, in which:

FIGS. 6 and 7 are flow diagrams showing example methods of printing with an emulsion.

Throughout the drawings, identical reference numbers designate similar, but not necessarily identical, elements.

DETAILED DESCRIPTION

Figure 1:
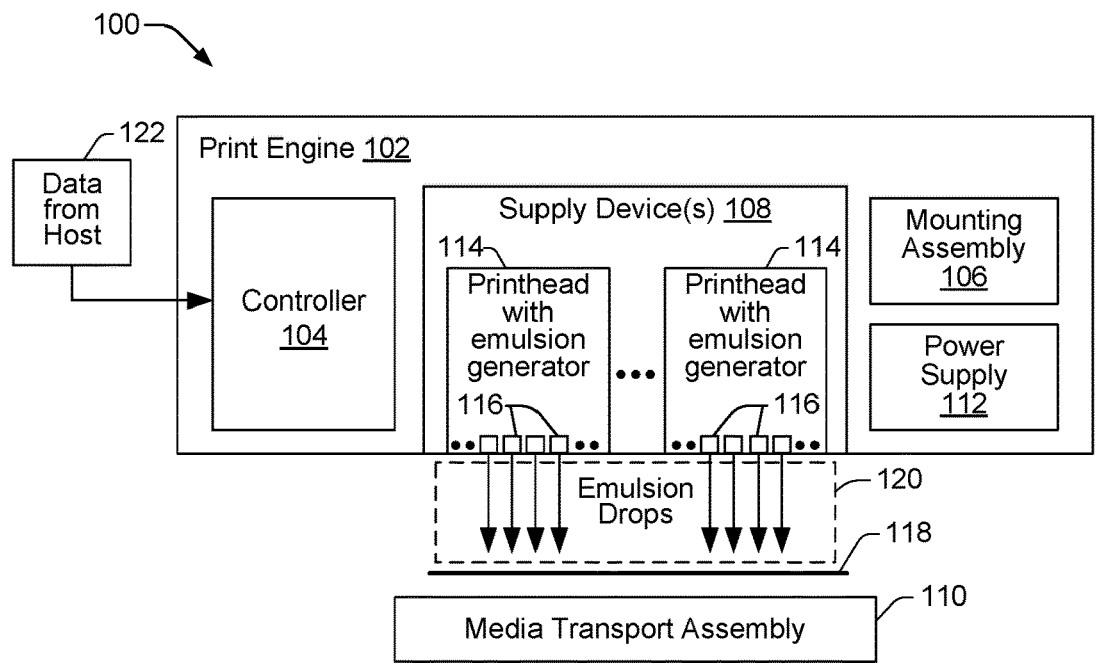
FIG. 1 shows an example of an inkjet printing system suitable for implementing a fluid ejection device with an emulsion generator to enable printing with an emulsion.

Inkjet printers can implement a variety of different inkjet printhead technologies. Different drop-on-demand inkjet printers, for example, can employ either piezo or thermal inkjet printhead technologies. The ink or other fluids used in piezo and thermal inkjet printheads depends in part on the drop ejection mechanisms of the two technologies. While piezo inkjet printheads generate mechanical pressure pulses to eject fluid drops, thermal inkjet printheads eject fluid drops by generating intense heat to vaporize a volatile component of the fluid. The difference in the piezo and thermal ejection mechanisms in some instances enables piezo printheads to use a wider variety of inks and other fluids than thermal printheads.

Thermal inkjet printheads can comprise columns of many tiny nozzles that each have an underlying fluid chamber and heating element. Fluid (e.g., ink) drops are ejected from a nozzle by passing a current pulse through the underlying heating element which heats and rapidly vaporizes some of the fluid in the chamber, forming a vapor bubble. The rapidly expanding vapor bubble causes a large pressure increase within the chamber that ejects a fluid drop through the nozzle. The collapse of the vapor bubble creates a negative pressure that pulls additional fluid through a fluid channel to refill the chamber in preparation for a next drop ejection event.

Inks and other fluids used in thermal inkjet printheads are water-based and/or comprise a volatile component capable of boiling and generating a vapor bubble when exposed to high heat from a heating element. The use of non-water based inks such as oil and solvent based inks in thermal inkjet printheads makes vapor bubble formation difficult due to the high boiling temperatures of such fluids. In addition the use of non-water based inks can increase the build-up of ink residue on the heating elements, called kogation, which can adversely impact fluid drop ejection. Therefore, thermal inkjet printheads generally do not use non-water based inks or fluids, but instead use water-based carrier fluid with pigments or dyes as colorant.

By contrast, piezoelectric inkjet printheads operate by generating mechanical pressure pulses to eject fluid drops from nozzles. Instead of a heating element, the nozzles in piezoelectric printheads use a piezoelectric material in an underlying fluid chamber to create pressure pulses to eject fluid drops. This drop ejection mechanism avoids some of the issues noted above with thermal inkjet printheads and enables a wider range of inks and other fluids to be used in piezoelectric printheads, such as oil based and solvent based inks.

While piezoelectric inkjet printheads are capable of jetting a wider range of inks and fluids than thermal inkjet printheads, they can be more costly to produce. Piezo drop ejection components use a special piezoelectric material and they consume a larger amount of space on a silicon die substrate than comparable thermal drop ejection components (i.e. heating elements). Thus, thermal inkjet printheads in some instances may enable a higher nozzle counter per area and are cheaper to construct using photolithography and other microfabrication techniques.

Examples of a thermal inkjet printhead device disclosed herein enable in situ generation of an emulsion of immiscible fluids that comprises a non-water based fluid (e.g., oil, solvent) and a water based carrier fluid. The emulsion can be readily ejected virtually immediately upon its generation from a fluid drop ejector of the thermal inkjet printhead device. An example printhead device includes two separate supplies of immiscible fluids, such as a water based carrier fluid reservoir and an oil based (i.e., non-water based) fluid reservoir. The immiscible fluids can be drawn together to form an emulsion by a negative pressure at the junction of two microfluidic channels. The negative pressure that draws the immiscible fluids together at the junction is created by a drop ejector that produces fluid flow. More specifically, the reciprocal action (i.e., collapse) of a drop-ejecting vapor bubble created by the drop ejector pulls fluid into a fluid ejection chamber during a refill process in preparation for a next drop ejection event. The negative pressure and flow velocity at the channel junction can be increased by a venturi (i.e., a constricted channel section) to initiate oil drop formation and dispersion within the water based carrier fluid, generating the emulsion. The in situ generation of the emulsion followed virtually immediately by its ejection from a printhead nozzle eliminates emulsion instability issues.

In a particular example, a method of printing with an emulsion includes generating an emulsion of non-water based fluid and water based fluid on a printhead and ejecting the emulsion through a printhead nozzle. Generating the emulsion includes creating a negative pressure in a fluid ejection chamber to pull water based fluid from a first channel and non-water based fluid from a second channel into a common channel that leads to the fluid ejection chamber.

In another example, a device for printing with an emulsion includes a first microfluidic channel to provide a first fluid, and a second microfluidic channel to provide a second fluid. The first and second fluids are immiscible fluids. The device includes a negative pressure source to pull the first fluid and the second fluid into a common microfluidic channel to generate an emulsion of the first and second fluids. The device includes a fluid drop ejector in communication with the common microfluidic channel to eject the emulsion.

In another example, a printhead device for printing with an emulsion includes a fluid drop ejector to eject an emulsion from a nozzle. The device includes a first microfluidic channel to carry a first fluid from a first reservoir toward a fluid chamber of the fluid drop ejector, and a second microfluidic channel to carry a second fluid from a second reservoir. The device also includes a junction where the second microfluidic channel intersects the first microfluidic channel to generate the emulsion.

FIG. 1 shows an example of an inkjet printing system 100 suitable for implementing a fluid ejection device, such as a thermal inkjet printhead device 114, with an emulsion generator to enable printing with an emulsion. In some examples, the inkjet printing system 100 comprises a scanning type system where a printhead device with multiple fluid ejecting nozzles is mounted on a carriage that scans back and forth across the width of a print media. The nozzles deposit printing fluid in the form of an emulsion onto the media as the carriage scans back and forth, and the media is incrementally advanced between each scan in a direction perpendicular to the carriage scanning motion. In some examples, the scanning carriage supports multiple printhead devices.

In other examples of an inkjet printing system 100, multiple stationary printhead devices 114 can span the width of a print media to deposit printing fluid emulsion as the media is continually advanced. Such printing systems 100 include, for example, page-wide printers and wide-format printers having print bars that support the multiple printhead devices across the full width of the print media.

In one example, the inkjet printing system 100 includes a print engine 102 having a controller 104, a mounting assembly 106, replaceable supply devices 108 (e.g., ink cartridges, ink reservoirs, print bars), a media transport assembly 110, and a power supply 112 that provides power to the various electrical components of inkjet printing system 100. The inkjet printing system 100 further includes fluid ejection devices implemented as printhead devices 114 that eject fluid emulsion droplets and/or other fluid through a plurality of nozzles 116 (also referred to as orifices or bores) toward print media 118 so as to print onto the media 118. In some examples a printhead device 114 comprises an integral part of an ink cartridge supply device 108, while in other examples a plurality of printhead devices 114 can be mounted on a media wide print bar supply device 108 (not shown) supported by mounting assembly 106 and fluidically coupled (e.g., via a tube) to an external fluid supply reservoir (not shown). Print media 118 can be any type of suitable sheet or roll material, such as paper, card stock, transparencies, Mylar, polyester, plywood, foam board, fabric, canvas, and the like.

In one example, a printhead device 114 comprises a thermal inkjet printhead device that generates vapor bubbles with a heating element to force fluid emulsion droplets out of a nozzle 116. In an example implementation, the printhead device 114 comprises a multi-layer structure composed of a large array of thermally-driven nozzles 116, capable of achieving high-speed printing in an industrial printing environment. A printhead device 114 is on the order of several millimeters in thickness and can have varying shapes with varying lengths and widths. Nozzles 116 in many instances may be arranged along the printhead device 114 in columns or arrays such that properly sequenced ejection of fluid emulsion (e.g., ink) from the nozzles 116 causes characters, symbols, and/or other graphics or images to be printed onto the print media 118 as the printhead device 114 and print media 118 are moved relative to each other.

Mounting assembly 106 positions printhead devices 114 relative to the media transport assembly 110, and the media transport assembly 110 positions print media 118 relative to the printhead devices 114. Thus, a print zone 120 is defined adjacent to nozzles 116 in an area between printhead devices 114 and print media 118. In one example, print engine 102 comprises a scanning type print engine. As such, mounting assembly 106 includes a carriage for moving printhead devices 114 relative to media transport assembly 110 to scan print media 118. In another example, the print engine 102 comprises a non-scanning type print engine that can include a single-pass, page-wide array of printhead devices 114. As such, mounting assembly 106 fixes printhead devices 114 at a prescribed position relative to media transport assembly 110 while media transport assembly 110 positions print media 118 relative to the printhead devices 114.

Controller 104 can include components of a standard computing system such as a processor, memory, processor-executable instructions, and other printer electronics for communicating with and controlling supply device 108, printhead devices 114, mounting assembly 106, and media transport assembly 110. Controller 104 receives data 122 from a host system, such as a computer, and temporarily stores the data 122 in a memory. Data 122 represents, for example, a document and/or file to be printed. As such, data 122 forms a print job for inkjet printing system 100 that includes print job commands and/or command parameters. Using data 122, the controller 104 controls printhead devices 114 to eject fluid emulsion ink drops from nozzles 116 in a defined pattern that forms characters, symbols, and/or other graphics or images on print medium 118.

Figure 2:
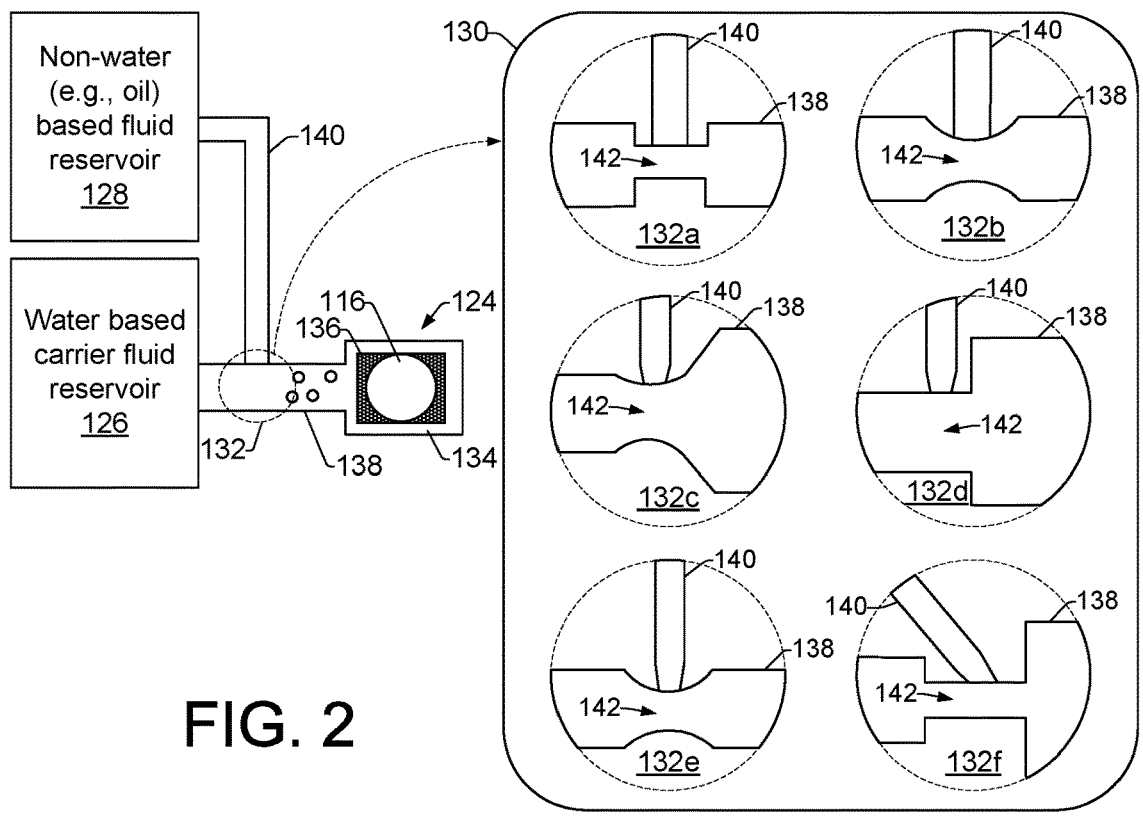
FIG. 2 shows an example of a drop ejector in an example functional arrangement with a non-water based fluid reservoir and a water based carrier fluid reservoir.

FIG. 2 shows an example of a basic drop ejector 124 in an example functional arrangement with a non-water based (e.g., oil based) fluid reservoir 126 and a water based carrier fluid reservoir 128. The example arrangement shown in FIG. 2 is suitable for implementation within an example printhead device 114 to generate and eject an emulsion of immiscible fluids such as a water based fluid from reservoir 126 and a non-water based fluid from reservoir 128. In some examples, such as with reference to FIGS. 3-5, a fluid reservoir 126 and/or 128 can also be referred to as a fluid slot and/or an oil slot. FIG. 2 includes an image blow up 130 illustrating a number of example microfluidic channel junctions 132 that are suitable for bringing together immiscible fluids from the reservoirs 126 and 128 to generate an emulsion. As shown in the example arrangement of FIG. 2, a drop ejector 124 includes a nozzle 116, a fluid chamber 134, and a resistive heating element 136 disposed within the fluid chamber 136. The drop ejector 124 is in fluid communication with the water based fluid reservoir 126 and non-water based fluid reservoir 128 through a first microfluidic channel 138 and a second microfluidic channel 140, respectively.

Referring still to FIG. 2, during operation a fluid drop can be ejected from fluid chamber 134 through corresponding nozzle 116, after which the chamber 134 is refilled with fluid provided through first microfluidic channel 138. More specifically, an electric current can be passed through the heating element 136 resulting in rapid heating of the element. A thin layer of fluid adjacent to the heating element 136 is superheated and vaporizes, creating a vapor bubble within the firing chamber 134. The rapidly expanding vapor bubble forces a fluid drop out of the nozzle 116. When the heating element 136 cools, the vapor bubble quickly collapses, creating a vacuum or negative pressure that draws in more fluid from the first microfluidic channel 138 in preparation for ejecting another drop from the nozzle 116.

The negative pressure caused by the collapsing vapor bubble can generate a high speed reciprocal fluid motion at the junction 132 of the microfluidic channels 138 and 140, which pulls fluid from both the water based fluid reservoir 126 through microfluidic channel 138 and the non-water based (i.e., oil based) fluid reservoir 128 through microfluidic channel 140 to create an emulsion. As shown in the image blow up 130 of FIG. 2, the junction 132 of the microfluidic channels 138 and 140 can have a variety of junction geometries. More specifically, the junction 132 includes a constricted channel section 142 that can be referred to as a venturi 142. The venturi 142 can increase the negative pressure and flow velocity of fluids as they pass through the constricted channel section, initiating oil drop formation and dispersion within the water based carrier fluid and generating the emulsion.

The venturi 142, or constricted channel section 142, generally comprises a section of the first microfluidic channel 138 that is reduced in size and/or diameter with respect to the remaining portions of the channel, as shown in the various examples of junctions 132a-132f in the blow up 130 in FIG. 2. In addition to different geometries of the venturi 142 at the junction 132 (e.g., squared geometries, curved geometries), the second microfluidic channel 140 can intersect the first microfluidic channel 138 at the venturi 142 in different ways. For example, as shown in junction 132a, the second microfluidic channel 140 can intersect the venturi 142 at a right angle, or as shown in junction 132f, the second microfluidic channel 140 can intersect the venture 142 at a different angle. In addition, the intersection point of the second microfluidic channel 140 can have different geometries such as straight and tapered geometries, as shown at junctions 132b and 132e, respectively.

Varying the intersection geometries at the junction 132 enables adjustments to the ratio of fluids entering the second microfluidic channel 140 that are to be mixed into the emulsion and pulled into the fluid chamber 134 for ejection through nozzle 116.

Figure 3:
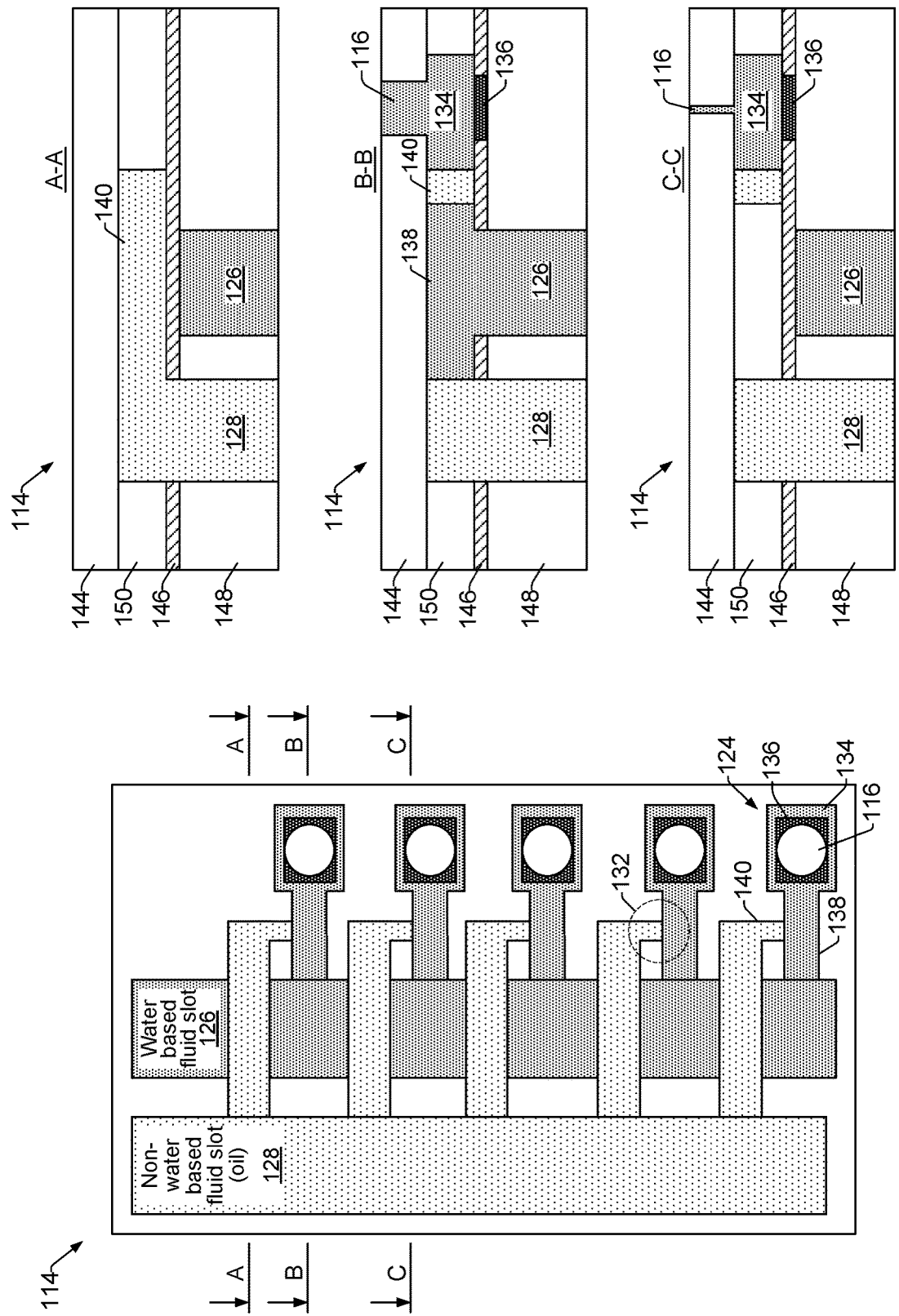
FIG. 3 shows a plan view and several cross-sectional views of an example printhead device.

FIG. 3 shows a plan view of a portion of an example printhead device 114 and several associated cross-sectional views taken along lines A-A, B-B, and C-C of the plan view. Referring now generally to FIGS. 1-3, nozzles 116 are formed in a top nozzle layer 144 of a printhead device 114 and are generally arranged to form nozzle columns along the sides of the fluid slots or reservoirs 126, 128. The resistive heating element 136 can be formed of a metal plate (e.g., tantalum-aluminum, TaAl) on a primer or insulating layer 146 (e.g., polysilicon glass, PSG) on a top surface of a silicon substrate 148. A chamber layer 150, or barrier layer 150, has walls and chambers 134 that separate the silicon substrate 148 from the top nozzle layer 144. The water based fluid slot 126 and non-water based fluid (oil) slot 128 are formed in the silicon substrate 148.

As shown in the different views of FIG. 3, the example printhead device 114 comprises a fluid slot and microfluidic channel configuration that enables one fluid supply to cross over another fluid supply to allow mixing of the fluids into an emulsion at a junction 132 of microfluidic channels 138 and 140. In the examples shown in FIGS. 2 and 3, the non-water based fluid (oil) crosses over the water based fluid through a microfluidic channel 140 that is formed within the chamber layer 150 of the printhead device 114. The microfluidic channel 140 comprises a bridge over the fluid slot/reservoir 126 that is constrained by the primer layer 146 and the walls of the chamber layer 150.

Figure 4:
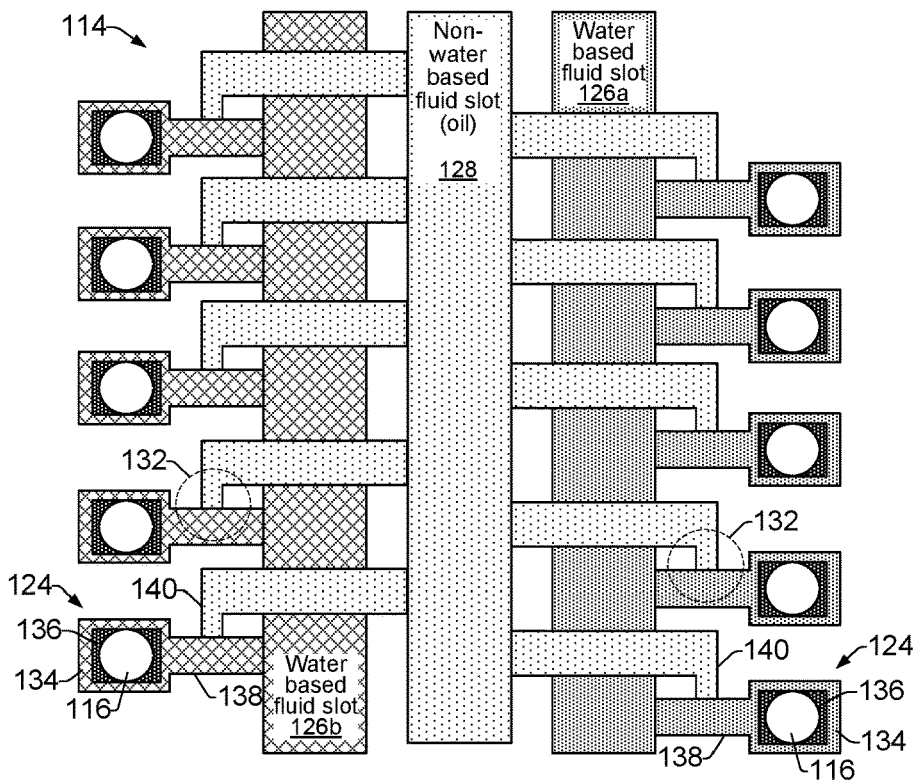
FIGS. 4 and 5 show plan views of example printhead devices that have varying fluid slot/reservoir designs and different nozzle configurations.
Figure 5:
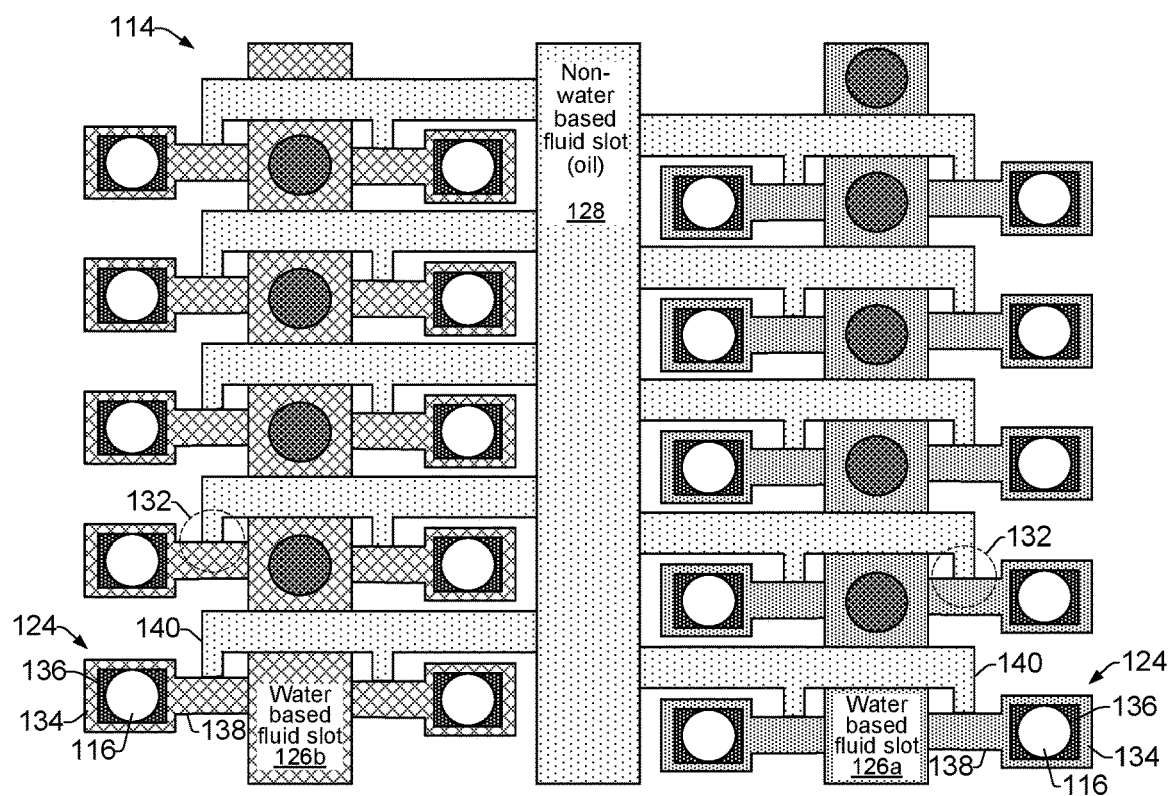

FIGS. 4 and 5 show plan views of example printhead devices 114 that have varying fluid slot/reservoir designs and different nozzle configurations. The printhead device 114 in FIG. 4, for example, includes two water based carrier fluid reservoirs or slots 126a and 126b, and one non-water based fluid (e.g., oil) slot 128. The two water based carrier fluid reservoirs or slots 126a and 126b are located on either side of the oil slot 128, and in different examples, the two slots 126a and 126b can either be coupled to one another to supply the same water based carrier fluid, or they can be uncoupled to supply different water based carrier fluids. As discussed above with regard to the FIG. 3 example, the example printhead device in FIG. 4 comprises a fluid slot and microfluidic channel configuration that enables the non-water based fluid (oil) to cross over the water based fluids through a microfluidic channel that is formed within the chamber layer of the printhead device 114.

Referring to FIG. 5, an example printhead device 114 includes four columns of nozzles 116. Two nozzle columns are supplied by each of the two water based carrier fluid reservoirs or slots 126a and 126b. The example device 114 in FIG. 5 additionally shows ink feed holes disposed in the two water based carrier fluid reservoirs or slots 126a and 126b. The ink feed holes enable implementations, for example, in which the water based fluid supplies can be supplied from sources other than slots formed into the silicon substrate 148 of the printhead device 114.

FIGS. 6 and 7 are flow diagrams showing example methods 600 and 700 of printing with an emulsion, as discussed above with regard to FIGS. 1 through 5. Method 700 is an extension of method 600 that incorporates additional details of printing with an emulsion. The methods can be performed in an inkjet printhead device such as the thermal inkjet printhead 114 described above with regard to FIGS. 1 through 5.

Referring now to method 600 of FIG. 6, as shown at block 602, an example method of printing with an emulsion includes generating an emulsion of non-water based fluid and water based fluid on a printhead. As shown at block 604, the method also includes ejecting the emulsion through a printhead nozzle.

As noted above, method 700 is an extension of method 600 that incorporates additional details of a method of printing with an emulsion. Thus, as shown at block 702, method 700 includes generating an emulsion of non-water based fluid and water based fluid on a printhead. In some examples, as shown at block 704, generating an emulsion includes creating a negative pressure in a fluid ejection chamber to pull water based fluid from a first channel and non-water based fluid from a second channel into a common channel leading to the fluid ejection chamber. In some examples, generating an emulsion can include causing the non-water based fluid to flow through a microfluidic channel that crosses over a water based fluid slot on the printhead, as shown at block 706. In some examples, as shown at block 708, generating an emulsion includes causing the water based fluid to flow through a first microfluidic channel toward a drop ejector, and causing the non-water based fluid to flow through a second microfluidic channel and mix with the water based fluid at a junction of the first and second microfluidic channels. In some examples, generating an emulsion can also include controlling a geometry of the junction formed by the first and second microfluidic channels, as shown at block 710.

As shown at block 712, the method 700 can include increasing a fluid flow speed within the common channel by providing a constricted section in the common channel. As shown at block 714, the method 700 can include ejecting the emulsion through a printhead nozzle.

What is claimed is:

1. A method of printing with an emulsion, comprising:
   generating an emulsion of non-water based fluid and water based fluid on a printhead by creating a negative pressure in a fluid ejection chamber to pull water based fluid from a first channel and non-water based fluid from a second channel into a common channel leading to the fluid ejection chamber;
   increasing a fluid flow speed within the common channel by providing a constricted section in the common channel; and,
   ejecting the emulsion through a printhead nozzle.

2. A method as in claim 1, wherein generating an emulsion comprises causing the non-water based fluid to flow through a microfluidic channel that crosses over a water based fluid slot on the printhead.

3. A method as in claim 1, wherein generating an emulsion comprises:
   causing the water based fluid to flow through a first microfluidic channel toward a drop ejector; and
   causing the non-water based fluid to flow through a second microfluidic channel and mix with the water based fluid at a junction of the first and second microfluidic channels.

4. A method as in claim 3, wherein generating an emulsion further comprises controlling a geometry of the junction formed by the first and second microfluidic channels.

5. A device for printing with an emulsion, comprising:
   a first microfluidic channel to provide a first fluid;
   a second microfluidic channel to provide a second fluid, the first and second fluids being immiscible fluids;
   a negative pressure source to pull the first fluid and the second fluid into a common microfluidic channel to generate an emulsion of the first and second fluids;
   a junction of the first and second microfluidic channels comprising a constricted section of the common microfluidic channel into which the first and second fluids are to be pulled; and,
   a fluid drop ejector in communication with the common microfluidic channel to eject the emulsion.

6. A device as in claim 5, wherein the negative pressure source comprises the fluid drop ejector following a drop ejection event in which a fluid ejection chamber of the fluid drop ejector is refilling with fluid.

7. A device as in claim 5, wherein the second microfluidic channel enables the second fluid to flow over a fluid slot containing the first fluid.

8. A device as in claim 7, wherein:
   the fluid slot is formed in a substrate of the device; and,
   the second microfluidic channel crosses over the fluid slot through a chamber layer of the device and is constrained within the chamber layer by a primer layer and walls of the chamber layer.

9. A printhead device for printing with an emulsion, comprising:
   a fluid drop ejector to eject an emulsion from a nozzle;
   a first microfluidic channel to carry a first fluid from a first reservoir toward a fluid chamber of the fluid drop ejector;
   a second microfluidic channel to carry a second fluid from a second reservoir; and,
   a junction where the second microfluidic channel intersects the first microfluidic channel comprising a constricted section of a common microfluidic channel into which the first and second fluids are to be pulled to generate the emulsion.

10. A printhead device as in claim 9, wherein the first fluid and the second fluid are immiscible fluids with respect to one another.

\* \* \* \* \*